(12) United States Patent
Yang

(10) Patent No.: US 7,987,397 B2
(45) Date of Patent: *Jul. 26, 2011

(54) TESTING MOBILE WIRELESS DEVICES DURING DEVICE PRODUCTION

(75) Inventor: Lianghua Yang, Kitchener (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/944,949

(22) Filed: Nov. 12, 2010

(65) Prior Publication Data

US 2011/0060953 A1    Mar. 10, 2011

Related U.S. Application Data

(63) Continuation of application No. 12/488,765, filed on Jun. 22, 2009, now Pat. No. 7,856,580, which is a continuation of application No. 11/413,028, filed on Apr. 28, 2006, now Pat. No. 7,610,529.

(51) Int. Cl.
 *G01R 31/28*    (2006.01)
 *H04W 24/00*    (2009.01)
(52) U.S. Cl. .................. 714/724; 714/741; 455/423
(58) Field of Classification Search .......... 714/724, 714/741; 455/423
 See application file for complete search history.

(56) References Cited

U.S. PATENT DOCUMENTS

| | | | | |
|---|---|---|---|---|
| 5,461,588 A | * | 10/1995 | Sardeson et al. | 365/201 |
| 7,266,028 B1 | * | 9/2007 | Ghosh Dastidar | 365/201 |
| 7,330,724 B2 | * | 2/2008 | Lipsit | 455/423 |
| 7,400,884 B2 | * | 7/2008 | Fok et al. | 455/414.2 |
| 7,559,000 B2 | * | 7/2009 | Sato | 714/738 |
| 7,559,003 B2 | * | 7/2009 | Takahashi | 714/742 |
| 7,610,529 B2 | * | 10/2009 | Yang | 714/724 |
| 7,856,580 B2 | * | 12/2010 | Yang | 714/724 |
| 2006/0224730 A1 | * | 10/2006 | Fok et al. | 709/224 |

FOREIGN PATENT DOCUMENTS

| | | | |
|---|---|---|---|
| EP | 0730388 A | | 9/1996 |
| EP | 1309214 A | | 5/2003 |
| EP | 1517570 A | | 3/2005 |
| JP | 2000305957 | * | 11/2000 |
| JP | 2005071324 A | | 3/2005 |

OTHER PUBLICATIONS

Extended European Search Report issued by the European Patent Office dated Aug. 9, 2006 for corresponding European Patent Application No. 06113287.4.

Decision to Grant a European Patent issued from the European Patent Office dated Dec. 13, 2007 for corresponding European Patent Application No. 06113287.4.

Office Action issued by the Canadian Intellectual Property Office dated Nov. 12, 2010 for corresponding Canadian Patent Application No. 2,585,900.

* cited by examiner

*Primary Examiner* — John J Tabone, Jr.
(74) *Attorney, Agent, or Firm* — Gowling Lafleur Henderson LLP

(57) ABSTRACT

A system and method of testing a wireless communication device during device production comprises designating as a data log buffer when the device is being produced, at least part of random access memory (RAM) of the device that is allocated for virtual machine and/or application usage when the device is operational; and testing the device and storing test log data in the buffer. After testing, the data can be obtained from the buffer and processed using a debugging and log analysis tool.

26 Claims, 6 Drawing Sheets

FIG. 1 -- Prior Art --

TESTING MOBILE WIRELESS DEVICES DURING DEVICE PRODUCTION

CROSS REFERENCE TO RELATED APPLICATION

This application is a continuation under 35 U.S.C. 120 of earlier filed nonprovisional application having application Ser. No. 12/488,765 filed Jun. 22, 2009, now U.S. Pat. No. 7,856,580, granted on Dec. 21, 2010, which is a continuation of U.S. nonprovisional application Ser. No. 11/413,028 filed Apr. 28, 2006, now U.S. Pat. No. 7,610,529, granted on Oct. 27, 2009. This application incorporates by reference the disclosures of both aforementioned applications in their entirety.

TECHNICAL FIELD

The following relates to the field of wireless communication devices, and more specifically, to testing and/or calibrating wireless communication devices during device production.

BACKGROUND

Wireless communication devices, such as cellular phones, personal digital assistants and the like, have components that include microprocessors, input peripherals such as a keypad, special function buttons and wheels, output peripherals, and information storage means. These devices run one or more software applications such as micro-browsers, address books, and email clients. Additionally, current generations of such devices have access to a plurality of services via the Internet. A wireless device may, for example, be used to browse web sites on the Internet, to transmit and receive graphics, and to execute streaming audio and/or video applications.

Such devices are typically tested and calibrated during their respective production to ensure reliability and quality control with compliance to relevant standards and performance requirements. A wireless device typically progresses through various calibration and test stages to qualify each of its components. For mobile devices these tests may include the following: AC, DC, radiated radio frequency (RF), keys, internal microphone (mic), internal speaker, charger, buzzer, vibrator, and screen. Depending on the initial path of test development, most production lines include a series of calibration and testing stations wherein each station sequentially executes a series of calibrations and tests drawn from a test plan. Test stations often include computers that may record data obtained during testing; the data can be saved, via a data link between the computer and the device under test (DUT), from the DUT into the test station computer.

Conducting calibration and testing for increasingly complex wireless devices have resulted in increasingly longer per unit production times and/or low yield rates. Technicians on the production line are often unable to diagnose the cause of failure of a device at a test station, and have to replicate the failure in order to record dynamic device side data logs onto test station computers for later analysis by device firmware and/or software developers. Further, the production line technicians sometimes have difficulty acquiring complete and accurate logs from the devices being tested or calibrated. Conversely, the developers sometimes do not timely receive input from the production line that could be used to avoid existing or potential production line problems. A need therefore exists for a method, product and/or system for efficiently testing wireless devices and outputting original, accurate and complete device side logs during device production. Accordingly, a solution that addresses, at least in part, the above and other shortcomings is desired.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION

Figure 1:
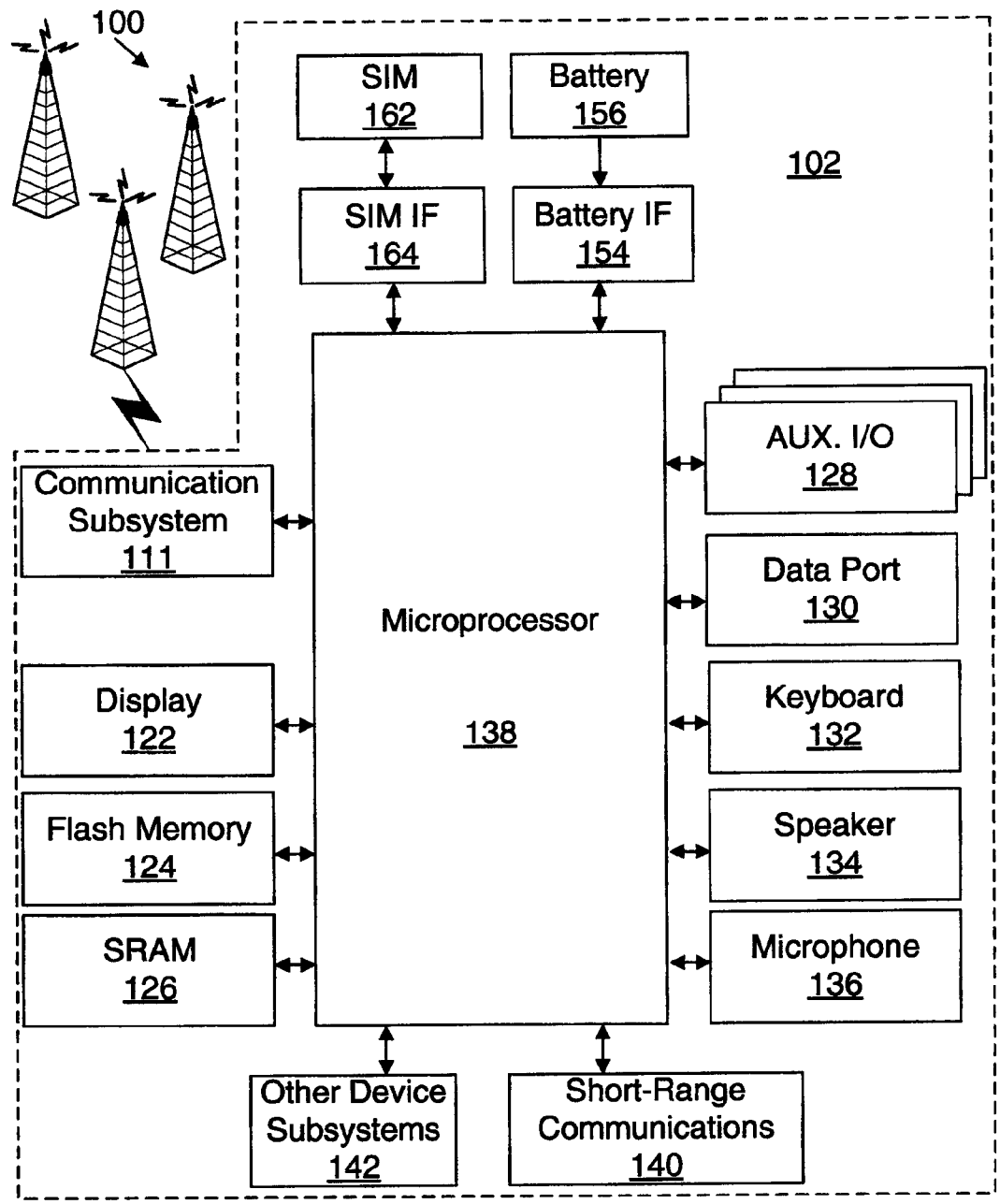
FIG. 1 is a block diagram of a preferred wireless communication device adapted for implementing an embodiment.

According to one aspect, there is provided a method of testing a wireless communication device during device production. The method comprises designating as a data log buffer when the device is being produced at least part of random access memory (RAM) of the device that is allocated for virtual machine and/or application usage when the device is operational in end-user mode; and testing the device and storing test log data in the buffer. The allocated buffer size can be large enough to store an entire testing/calibration procedure. The method can further comprise after testing, obtaining the logged data from the device RAM buffer and processing the data using a debugging and log analysis tool. The logged data can be sent to a testing station then to an intranet storage and the data can be processed later by engineers with different expertise. The RAM can be static random access memory (SRAM).

According to another aspect, there is provided a computer program product for testing a wireless communication device during device production. The product comprises a memory having computer readable code embodied therein, wherein the code includes statements and instructions to carry out the above method.

According to yet another aspect, there is provided a system for testing a wireless communication device during device production. The system comprises a testing station communicative with the device and for testing the device during production; and a computer readable memory communicative with the device and having recorded thereon statements and instructions to designate as a data log buffer when the device is being produced at least part of RAM of the device that is allocated for virtual machine and/or application usage when the device is operational in end-user mode, and to store test log data in the buffer obtained from testing and calibration of the device. The system can further include a debugging and log analysis tool communicative with the device to process the data from the buffer.

According to yet another aspect, there is provided a method of assembling a wireless communication device comprising providing components of the device to a production line, the components including RAM, and assembling the components into a completed device on the production line. Before and/or during and/or after assembly of the components, at least part the RAM of the device that is allocated for virtual machine or application usage when the device is operational in end-user mode is designated as a data log buffer; and the device is tested and test log data is stored in the buffer.

According to one embodiment, a certain portion of SRAM resident on a wireless communication device is used during device production line testing and calibration as a data log buffer to record logs for a post-mortem debugging using a log analysis tool. This portion of SRAM is normally reserved for Java Virtual Machine (JVM) use when the wireless device is operational in end-user mode; however, this portion of SRAM is unused when the wireless device is being manufactured, calibrated and tested on the production line, i.e. is a "device under testing" (DUT). While on the production line, at least one megabyte of this portion of SRAM is reallocated for use as a data log buffer to log some or all calibration and test commands, actions and results, as well as some or all of the device calibration and test actions of radio and device firmware in the device operating system (OS) generated during testing at each test station on the production line. The data logged in the data log buffer can be different and more detailed than data conventionally acquired by the test stations during device testing. After device testing has been completed, the data log buffer can be downloaded from the DUT to a test station computer and stored therein for immediate or later analysis. Alternatively or additionally, the downloaded data log buffer can be sent to other locations for analysis, e.g. to remotely located wireless device software and firmware development teams. The data log buffer can be downloaded each time the DUT is at a test station, or when the DUT fails a test or takes an unexpected longer time to complete a test. Logging the original test and calibration data in such a way is particularly advantageous as personnel conducting the test at the test station often do not have the expertise to diagnose the failure when the failure occurs, and the test data that is conventionally recorded during device testing is often insufficient for the development teams or other qualified personnel to diagnose the failure at a later time. Furthermore, the data log buffer represents additional production line data that is available to the development teams, and may allow these teams to anticipate and solve potential problems that would otherwise arise during production.

One example of a wireless communication device 102 adapted in accordance with an embodiment is shown in FIG. 1. Device 102 is a two-way communication device having at least voice and advanced data communication capabilities, including the capability to communicate with other computer systems. Depending on the functionality provided by device 102, it may be referred to as a data messaging device, a two-way pager, a cellular telephone with data messaging capabilities, a wireless Internet appliance, or a data communication device (with or without telephony capabilities). Device 102 may communicate with any one of a plurality of fixed transceiver stations 100 within its geographic coverage area.

Device 102 will normally incorporate a communication subsystem 111, which includes a receiver, a transmitter, and associated components, such as one or more (preferably embedded or internal) antenna elements and, local oscillators (LOs), and a processing module such as a digital signal processor (DSP) (all not shown). As will be apparent to those skilled in field of communications, particular design of communication subsystem 111 depends on the communication network in which device 102 is intended to operate.

Network access is associated with a subscriber or user of device 102 and therefore, depending on network type, the device 102 may require a Subscriber Identity Module or "SIM" card 162 to be inserted in a SIM IF 164 in order to operate in the network. Device 102 is a battery-powered device so it also includes a battery IF 154 for receiving one or more rechargeable batteries 156. Such a battery 156 provides electrical power to most if not all electrical circuitry in device 102, and battery IF 154 provides for a mechanical and electrical connection for it. The battery IF 154 is coupled to a regulator (not shown) which provides power V+ to all of the circuitry.

Device 102 includes a microprocessor 138 which controls overall operation of device 102. Communication functions, including at least data and voice communications, are performed through communication subsystem 111. Microprocessor 138 also interacts with additional device subsystems such as a display 122, a flash memory 124 or other persistent store, a static random access memory (SRAM) 126, auxiliary input/output (I/O) subsystems 128, a serial port 130, a keyboard 132, a speaker 134, a microphone 136, a short-range communications subsystem 140, and any other device subsystems generally designated at 142. Some of the subsystems shown in FIG. 1 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list. Radio and embedded software and JVM (collectively, "main operating system (OS) firmware"), as well as Java applications, are preferably stored in a persistent store such as the flash memory 124, which may alternatively be a read-only memory (ROM) or similar storage element (not shown). Those skilled in the art will appreciate that objects and other data generated by the main OS firmware, specific device applications, or parts thereof, may be temporarily loaded into a volatile store such as the SRAM 126.

While wireless device 102 operates on the Java platform and utilizes JVM and Java applications, other software platforms utilizing different virtual machines/application-framework and applications as is known in the art can be substituted.

Microprocessor 138, in addition to its operating system functions, preferably enables execution of software applications on device 102. A predetermined set of applications which control basic device operations, including at least data and voice communication applications, will normally be installed on device 102 during its manufacture. A preferred application that may be loaded onto device 102 may be a personal information manager (PIM) application having the ability to organize and manage data items relating to the user such as, but not limited to, instant messaging (IM), e-mail, calendar events, voice mails, appointments, and task items. Naturally, one or more memory stores are available on device 102 and SIM 162 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on device 102 with respect to such items. This is especially advantageous where the host computer system is the mobile station user's office computer system. Additional applications may also be loaded onto device 102 through network 100, an auxiliary I/O subsystem 128, data port 130, short-range communications subsystem 140, or any other suitable subsystem 142, and installed by a user in SRAM 126 or preferably the non-volatile store 124 for execution by microprocessor 138. Such flexibility in application installation increases the functionality of device 102 and may provide enhanced on-device functions, communication-related functions, or both. For example, secure communication applications may enable electronic commerce functions and other such financial transactions to be performed using device 102.

In a data communication mode, received information data such as a text message, an e-mail message, or web page download will be processed by communication subsystem 111 and input to microprocessor 138. Microprocessor 138 will preferably further process the information for output to display 122 and/or to auxiliary I/O device 128. A user of device 102 may also compose data items, such as e-mail messages, for example, using keyboard 132 in conjunction with display 122 and possibly auxiliary I/O device 128. Keyboard 132 is preferably a complete alphanumeric keyboard and/or telephone-type keypad. These composed items may be transmitted over a communication network through communication subsystem 111 or short range communication subsystem 140.

For voice communications, the overall operation of device 102 is substantially similar, except that the received signals would be output to speaker 134 and signals for transmission would be generated by microphone 136. Alternative voice or audio I/O subsystems, such as a voice message recording subsystem, may also be implemented on device 102. Although voice or audio signal output is preferably accomplished primarily through speaker 134, display 122 may also be used to provide an indication of the identity of a calling party, duration of a voice call, or other voice call related information, as some examples.

Data port 130 in FIG. 1 is normally implemented in a personal digital assistant (PDA)-type communication device for which synchronization with a user's desktop computer is a desirable, albeit optional, component. The data port 130 can be serial or USB. Data port 130 enables a user to set preferences through an external device or software application and extends the capabilities of device 102 by providing for information or software downloads to device 102 other than through a wireless communication network. The alternate download path may, for example, be used to load an encryption key onto device 102 through a direct and thus reliable and trusted connection to thereby provide secure device communication.

Short-range communications subsystem 140 of FIG. 1 is an additional optional component which provides for communication between device 102 and other different systems or devices, which need not necessarily be similar devices. For example, subsystem 140 may include an infrared device and associated circuits and components, or a Bluetooth™ communication module to provide for communication with similarly-enabled systems and devices. Bluetooth™ is a registered trademark of Bluetooth SIG, Inc.

Figure 2:
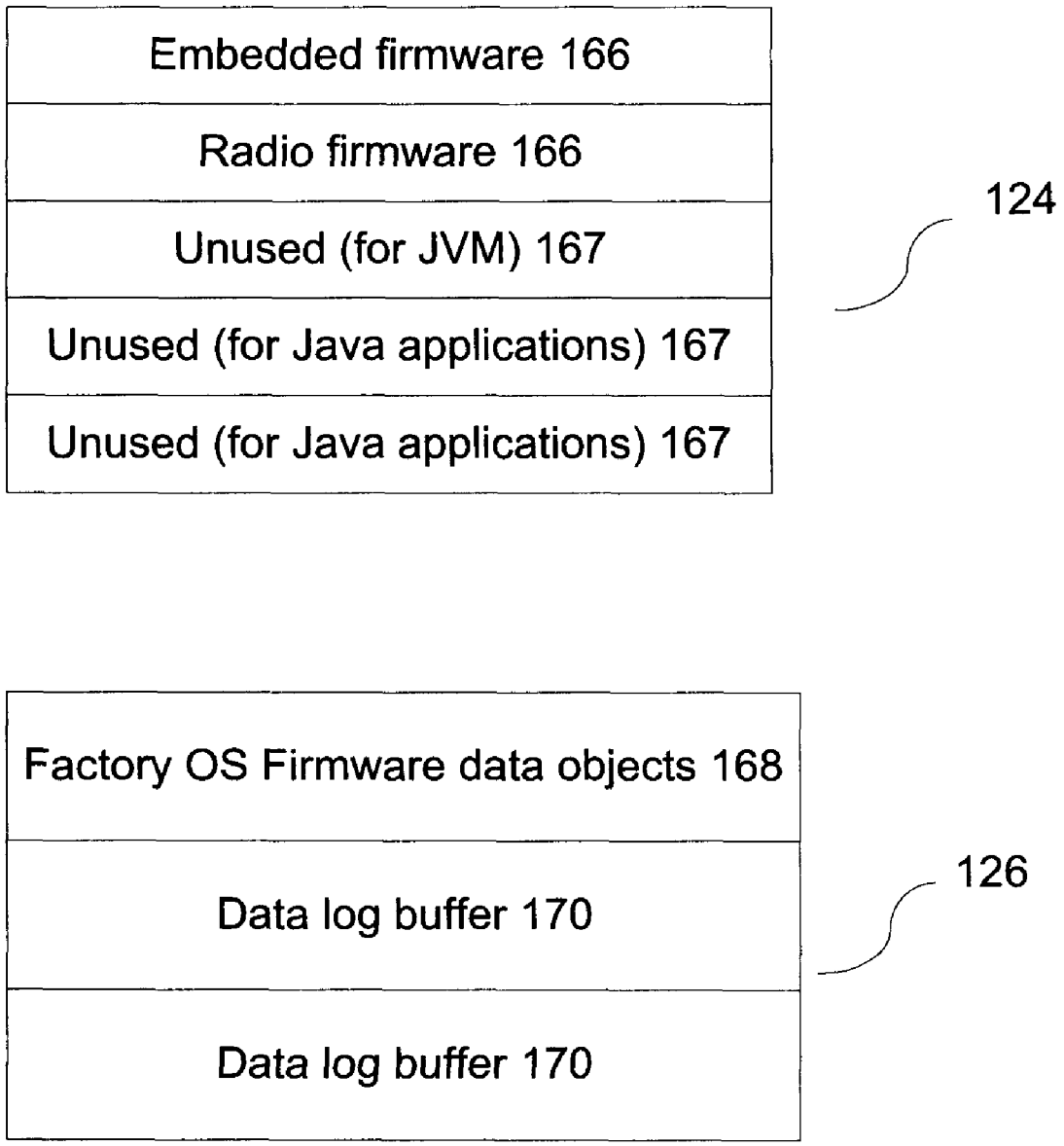
FIG. 2 is a block diagram illustrating the use of persistent and volatile memory in the device shown FIG. 1.

FIG. 2 illustrates use of device persistent and volatile memory during production line testing and calibration. A major part of the SRAM 126 on the device 102 is normally reserved for JVM and/or Java application use. However, this SRAM 126 is unused when the device 102 is being manufactured, and tested on the production line. During production line testing and calibration, the persistent flash memory 124 of a device's populated board is loaded with a version of radio and embedded firmware for immediate power-on initialization (collectively, "factory OS firmware") 166; no JVM or Java application software is resident in the flash memory 124 at this stage (empty memory modules shown as 167). A certain amount 168 of the SRAM 126 is allocated for storing data objects created during normal factory OS firmware operation. The remaining SRAM 126 reserved for JVM and applications when the device 102 is operational is designated during device production as a data log buffer 170 for recording all the events, actions and results of a testing and calibration procedure. The factory OS firmware includes a software configuration management (SCM) build with built-in output statement instructions for every calibration event, action and result to output the corresponding data into the data log buffer 170 ("logging firmware").

Each output statement instruction is a macro translated into a regular function call code piece when compiled. That is, associated with each output statement instruction is a separate corresponding function to execute a data operation, e.g. preparing and formatting the data entry, continuously writing the data entry into the RAM buffer 170. The output statement instructions are added to the firmware code by programmers in each of the calibration/testing code paths.

The output statement instructions are regular code lines whose output are also compatible with a debugging and log analysis program running on test stations and other developers' computers, and will be described in more detail below. Each output statement instruction will generate one data log entry formatted with a corresponding pre-defined structure, e.g. a basic C programming language style structure using type-length-data elements expansion. The data log entry is stored in the buffer 170. When stored, the data log entry can be encoded in binary and condensed as much as possible. For example, each description string can be associated with a unique four byte identifier by the log analysis program to create a unique one-to-one mapping. In the data log buffer 170, only the four byte identifier is logged at a data log entry. Later, the log analysis program can translate the stored identifier back into the original description string using the mapping. A data log entry in the buffer 170 may directly contain the byte stream of content based on self-defined data protocol, for example, a particular calibration command and a associated length indicator and a set of associated parameters.

Consider an example wherein 2 MB device SRAM starts at address 0x0800 0000 and ends at 0x081F FFFF. Assuming SRAM memory 168 occupies 0x0800 0000 to 0x0809 6000 (this address can be determined from a compiler/linker), the data log buffer 170 can start at 0x0809 6004 (4-byte alignment).

The following is a basic conceptual pseudo code for directing the function calls of the output statements to the data log buffer 170:

```
BYTE * actualLogBuf;
DWORD actualLogSize;
#define FIRMWARE_LOG_BUFFER_SIZE (16*1024)
BYTE firmwareLogBuf[FIRMWARE_LOG_BUFFER_SIZE];
#ifdef (FACTORY_OS_WITH_BIG_BUF) //reuse buffer 170 of memory 126
    actualLogBuf = APP_SRAM_START;
    actualLogSize = APP_SRAM_END- APP_SRAM_START+1;
#else           // no use of buffer 170 of memory 126
    actualLogBuf = (BYTE*)firmwareLogBuf;
    actualLogSize = APP FIRMWARE_LOG_BUFFER_SIZE;
#endif
```

APP_SRAM_START, APP_SRAM_END are macros defined in a linker file, set to 0x0809 6004 and 0x081F FFFF in the above example. If the output statement functions and log dump function only use "actualLogBuf" and "actualLogSize", with a new build, every data entry will be redirected automatically.

Typical wireless communication devices 102 have four or more megabytes of SRAM wherein about 800 kilobytes are allocated for normal factory OS firmware operation, and most of the remainder allocated for JVM and Java application usage. Since on the production line only the factory OS is operational, only about 800 kilobytes of SRAM is used, and over 3 megabytes of SRAM remains available for the data log buffer 170. Of course, devices 102 having larger amounts of SRAM can be configured with a larger data log buffer 170.

Figure 3:
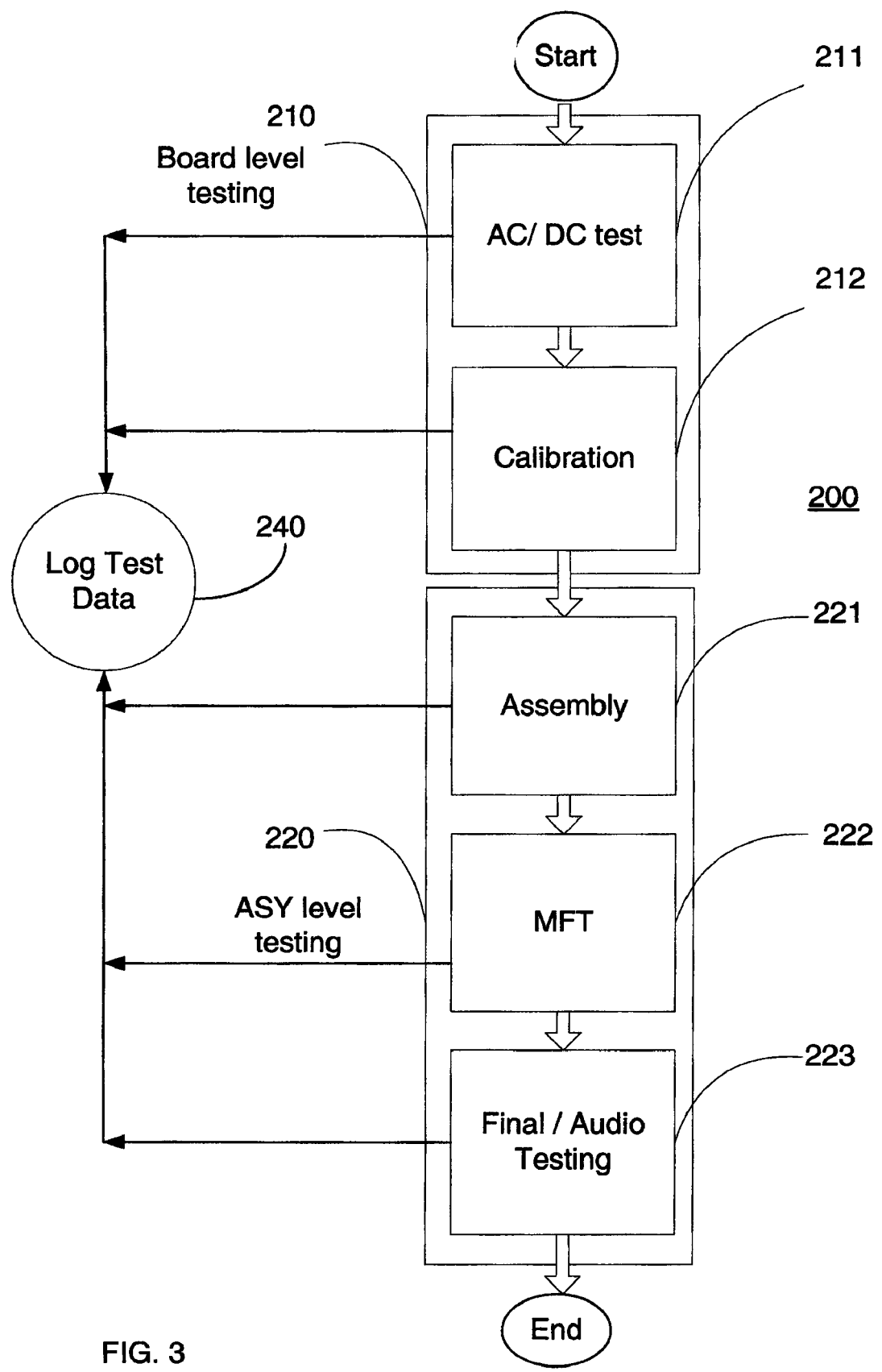
FIG. 3 is a flow chart illustrating a first method for testing wireless devices in accordance with an embodiment.
Figure 4:
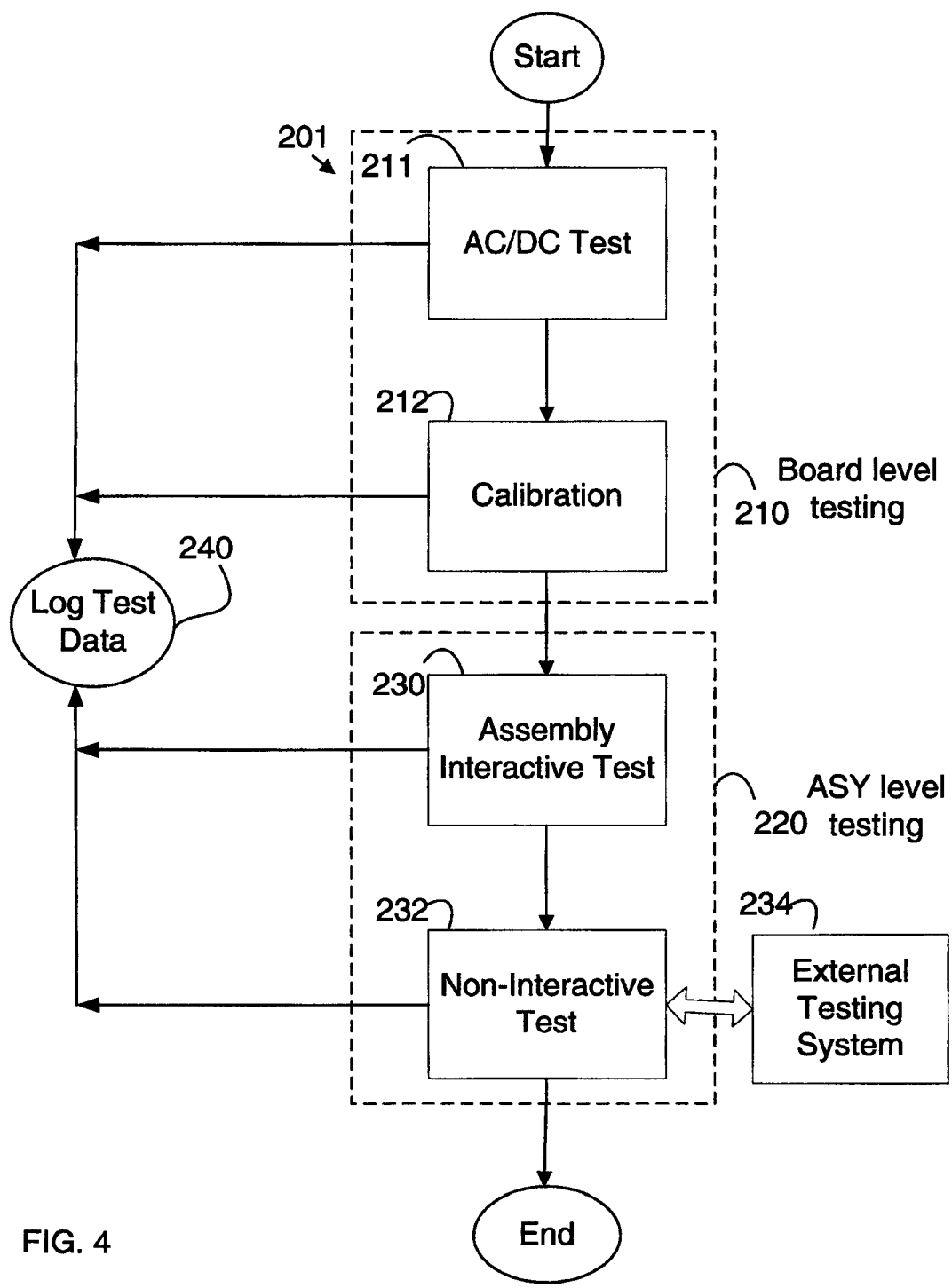
FIG. 4 is a flow chart illustrating a second method for testing wireless devices in accordance with an embodiment.

FIGS. 3 and 4 illustrate two different approaches to testing and calibrating wireless devices 102 in accordance with an embodiment of the invention. When the device 102 is undergoing testing, it will be referred to in this description as a "device under testing", or DUT 102. Referring to a first testing and calibration method 200 as shown in FIG. 3, testing is divided into a board level testing phase 210 and fully assembled ("ASY") level testing phase 220. The board level phase 210 may include an AC and DC test 211, a calibration test 212 e.g. to calibrate RF power, and a global positioning system (GPS) test (not shown). One or more test stations (not shown) are provided at each assembly and testing phase 221, 222, 223. During the ASY level of testing, wireless communication devices 102 are assembled and processed through a series of functional, RF, and audio tests. Heretofore, each test stage in ASY testing phase 220 usually requires its own test station comprising a test fixture and external test system. Often such tests are performed in three stages as follows: assembly 221, Multi-Functional Test (MFT) 222 such as testing LCD, keypad, vibrator, thumbwheel, LED etc., and final/audio testing (or RF and Audio) 223.

Referring to a second testing and calibration method 201 as shown in FIG. 4, ASY test phase 220 only includes two test stages: assembly and interactive test 230 and non-interactive test 232. By classifying ASY test phase tests 220 as either interactive 230 or non-interactive 232, the testing process can be reorganized based on the physical interaction requirements of the tests. A single external testing station 234 may be employed.

The assembly+interactive testing 230 test stage is where each interactive component of the assembled device (typically user input devices such as keyboard or keypad keys, special buttons and wheels or other such manually manipulated input devices) are tested for operation. An additional interactive test may include a holster test testing the action of holstering a device, as applicable. This activity of holstering may be sensed by the device and used to trigger one or more responses such as a power saving response or to set a state of the device useful for user notification profiles.

The non-interactive testing 232 test stage includes all non-interactive tests which are performed at a single test station. The design of the test station for performing non-interactive testing 232 includes minimal mechanical requirements. The test station for this testing includes external testing system 234 which is coupled to a test pad (not shown) which is in turn adapted to receive a test palette (not shown) which holds the wireless communication device.

During calibration and testing at each of the calibration/test stations 211, 212, 222, 223, 230 and 232, the DUT 102 is coupled to the test station by a cable (not shown) connected to the device's data port 130. For example, a USB cable can be used to provide power to the DUT 102 and enable two-way communication between the test station 211, 212, 222, 223, 230 and 232 and the DUT 102. During testing, the test station 211, 212, 222, 223, 230 and 232 sends calibration and test commands to the DUT 102 via the USB cable; calibration and test firmware resident on the DUT 102 responds to the commands and returns responses back to the test station 211, 212, 222, 223, 230 and 232 via the USB cable. Such testing is conventional and thus not described in further detail here.

While the DUT 102 is undergoing tests, the logging firmware on the DUT 102 is executed and a new data log containing different data log entries, in accordance with data logging step 240, is separately and independently recorded onto the buffer 170. These entries include calibration and test commands, device actions, and results according to the commands. As will be discussed in more detail below, the data log buffer 170 is downloaded from the DUT 102 into the test station 211, 212, 222, 223, 230 and 232 via the USB cable after the testing has been completed, so as not to interfere with the testing operation. The downloaded data log buffer 170 can be saved as a separate data file on a test station computer 300, or on a corporate database system or intranet storage system and analyze the log entries later with the assistance of the log analysis tool.

Figure 5:
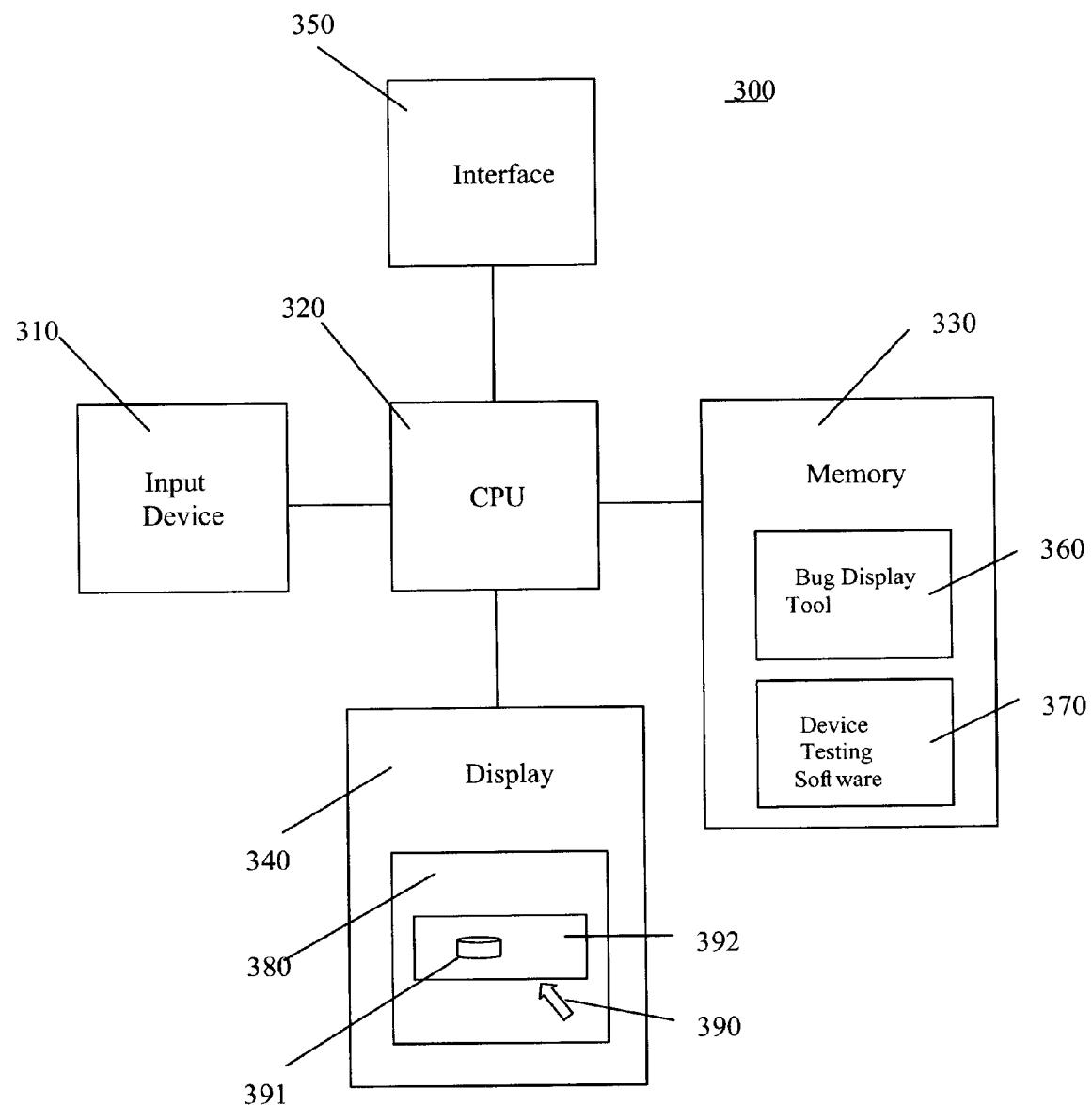
FIG. 5 is a block diagram illustrating an exemplary testing system adapted for implementing an embodiment.

Referring now to FIG. 5, an exemplary test station comprises the computer system 300 and a test pad and/or test palette (neither shown) communicative with the computer system 300. The computer system 300 includes an input device 310, a central processing unit or CPU 320, memory 330, a display 340, and an interface 350. The input device 310 may include a keyboard, mouse, trackball, remote control, or similar device. The CPU 320 may include dedicated coprocessors and memory devices. The memory 330 may include RAM, ROM, or disk devices. The display 340 may include a computer screen, terminal device, or a hardcopy producing output device such as a printer or plotter. And, the interface 350 may include a network connection including an Internet connection. The computer system 300 is adapted for testing wireless devices 102 in conjunction with a test palette (not shown) and a test pad (not shown). The interface 350 also includes various test connectors for coupling to the test pad as will be described below.

The computer system 300 may be a server system or a personal computer ("PC") system. The CPU 320 of the computer system 300 is operatively coupled to memory 330 which stores an operating system (not shown), such as IBM Corporation's OS/2™, Microsoft's Windows®, UNIX, etc., for general management of the system 300. The interface 350 may be used for communicating to external data processing systems through a network, such as the Internet. Examples of suitable platforms for the computer system 300 include iSeries™ servers and ThinkCentre™ personal computers available from IBM Corporation. The computer system 300 may include application server software (not shown), such as WebLogic® Server available from BEA Systems, Inc., for developing and managing distributed applications.

The computer system 300 includes computer executable programmed instructions for directing the system 300 to implement device testing using the test pads and test palletes ("device testing instructions") 370. The computer system 300 can also include a real time debugging and log analysis tool ("bug display tool") 360 that analyzes test data recorded from the DUT 102. The testing instructions 370 and the bug display tool 360 can be embodied in one or more testing software modules 360, 370 resident in the memory 330 of the computer system 300. Alternatively, the testing instructions 370 and bug display tool 360 can be embodied on a computer readable medium (such as a CD disk or floppy disk) which may be used for transporting the programmed instructions to the memory 330 of the computer system 300. Alternatively, the testing instructions 370 and bug display tool 360 can be embedded in a computer-readable, signal-bearing medium that is uploaded to a network by a vendor or supplier of the programmed instructions, and this signal-bearing medium may be downloaded through the interface 350 to the computer system 300 from the network by end users or potential buyers.

The CPU 320 of the computer system 300 is typically coupled to one or more input devices 310 for receiving user commands or queries and for displaying the results of these commands or queries to the user on a display 340. For example, user queries may be transformed into a combination of SQL commands for producing one or more tables of output data which may be incorporated in one or more display pages for presentation to the user. The CPU 320 is coupled to memory 330 for containing software modules 360, 370 and data such as base tables or virtual tables such as views or derived tables. As mentioned, the memory 330 may include a variety of storage devices including internal memory and external mass storage typically arranged in a hierarchy of storage as understood to those skilled in the art.

A user may interact with the computer system 300 and its software modules 360, 370 using a graphical user interface ("GUI") 380. The GUI 380 may be web-based and may be used for monitoring, managing, and accessing the computer system 300. GUIs are supported by common operating systems and provide a display format which enables a user to choose commands, execute application programs, manage computer files, and perform other functions by selecting pictorial representations known as icons, or items from a menu through use of an input or pointing device such as a mouse 310. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input or pointing device (e.g., a mouse) 310 to position a pointer or cursor 390 over an object 391 and by "clicking" on the object 391.

Typically, a GUI based system presents application, system status, and other information to the user in "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Figure 6:
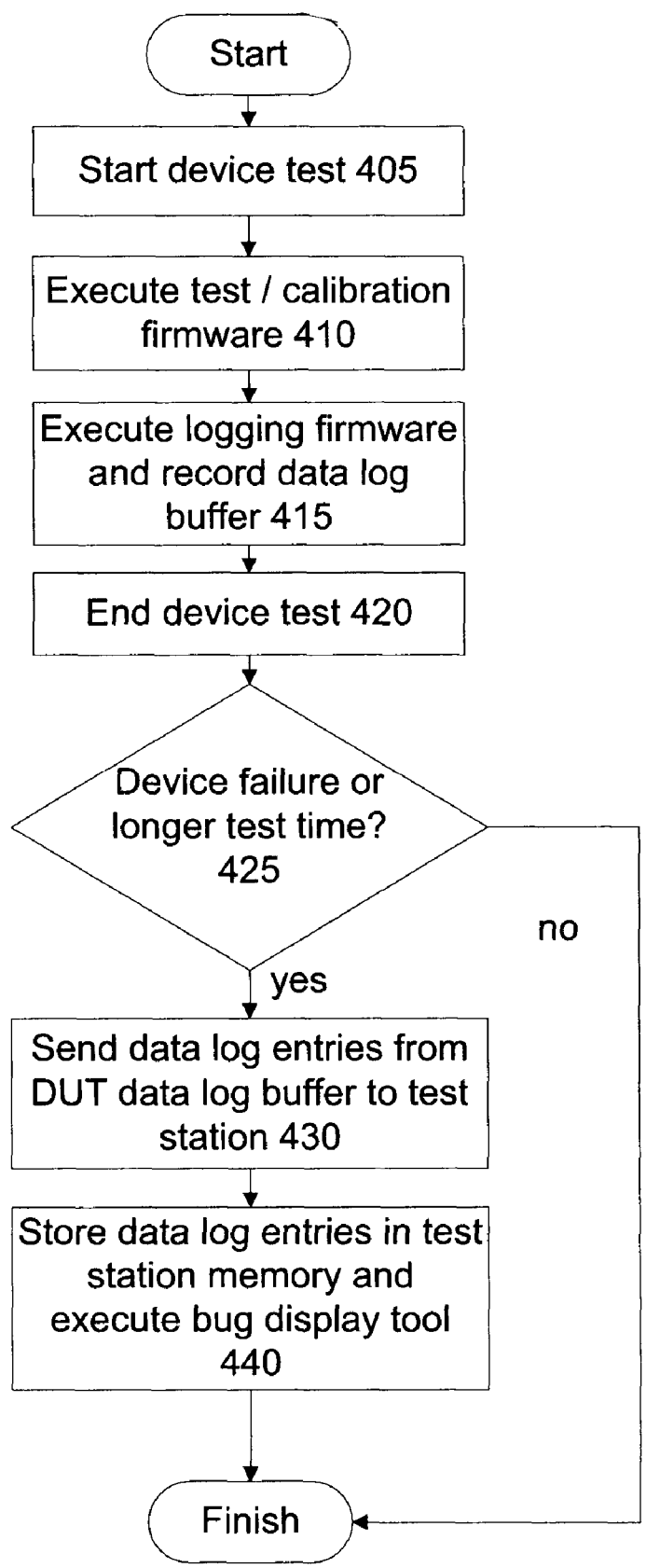
FIG. 6 is a flow chart illustrating a troubleshooting method used during the first or second testing methods in accordance with an embodiment.

Referring to FIG. 6, recording a data log buffer 170 on the DUT 102 is performed during conventional testing and calibration of the DUT 102 at each of the test stations 211, 212, 222, 223, 230 and 232. The DUT 102 arrives at a test station 211, 212, 222, 223, 230 and 232 and is connected to the test pad or test palette at the test station 211, 212, 222, 223, 230 and 232 by a cable connected to the device data port 130. When the test is started (step 405), the test station computer system 300 executes the device testing software 370 and sends test commands to the test pad and to the DUT 102 via the data port 130. In response to the commands, the DUT 102 executes a testing/calibration firmware application and returns results to the test station 211, 212, 222, 223, 230 and 232 also via the data port 130 (step 410). The commands sent by the computer system 300 and the results received from the test pad and/or DUT 102 are stored in the station memory 330. Also during testing, the DUT 102 executes the logging firmware application stored on its firmware (step 415); the testing/calibration application code has embedded therein output statement instructions at the parts of the test where data is desired to be logged. Data log entries generated in response to the instructions are stored in the data log buffer 170. These log entries can contain more detailed data about the device internal testing and calibration operation than the data obtained from testing using the test station software 370, and thus can be particularly useful for debugging and troubleshooting by development teams after the tests have been completed.

After the device testing has ended (step 420), the data port 130 is free for communication of the data log entries from the buffer 170 to a memory 330 on the test station computer system 300. The computer system 300 is programmed to transmit a signal via the data port 130 indicating that the test has ended and requesting that the data log entries be transmitted; upon receipt of this signal, the DUT 102 transmits the data log entries from the buffer 170 to the test station memory 330 (step 430). Optionally, the computer system 300 can be programmed to request the DUT 102 to transmit the data log entries only when a device failure occurs, or when a test has taken longer to complete than scheduled, which indicates a problem may have occurred (step 425).

In this embodiment, the data entries are not transmitted until after the testing has been completed (after step 420) to avoid possible interference with the tests. Certain tests test the timing and responsiveness of the DUT 102; during such tests, the test station software 370 expects the data port 130 bandwidth to be completely dedicated to communications between the DUT 102 and the tests station. If the logging firmware were to transmit data via the data port 130 during such tests, execution of the test or communications between the test station 211, 212, 222, 223, 230 and 232 and the DUT 102 may be delayed, thereby affecting the timing of the tests and resulting in accurate test results.

According to an alternative embodiment, the logging firmware is programmed to transmit the data log entries during device testing at a data rate that does not interfere with the execution of the tests. According to yet another alternative embodiment, the test station software 370 is programmed to instruct the DUT 102 to transmit the data entries during testing only when the test being executing is not a timing test.

Example output statement instructions that can be included in the logging firmware code that generate data log entries or statements which can be recognized by the bug display tool (or another log analysis tool or debugging tool) 360 include:

PRINT: emits a statement without any highlight. PRINT statements are typically used to log normal events worth logging.

WARN: identical to PRINT statements except output is highlighted. WARN statements are useful for identifying transactions that are suspicious, slightly unusual or may otherwise require attention.

ASSERT: a conditional statement that can be used to verify assumptions. The ASSERT statement asserts that a specified condition is true. If the condition is false, the ASSERT statement is emitted.

PRINTCOPY: allows dumping of an ASCII string, unlike the PRINT statement which only outputs a literal string.

SHOW_MEMORY: displays a section of memory as hexadecimal bytes.

EMIT STRUCTURE: similar to SHOW_MEMORY, except that a piece of memory is treated as a structure and is decoded as such.

Other forms of output. In addition to the above output statements, the bug display tool 360 can display other hard coded outputs that are used for displaying complicated but important and frequently used pieces of data. Examples include inter-task multithreading message logging for inter-task signals, as well as user data block logging and radio signalling data blocks.

After the data log entries have been stored on the computer system memory 330, the bug display tool 360 can be executed on the test station computer 300. When the bug display tool 360 is executed, the data log entries or statements are de-compacted by matching the module identifiers in the compacted output statements to corresponding debug strings from a string lookup table stored in the memory 330. The de-compacted output statements thus comprise a list of debug strings which are stored in the computer system memory 330. Then, the computer system 300 can display the output statements on the GUI 380 for test personnel at the test station to review immediately, and/or send the log as a data file containing output statements into a corporate database system or intranet storage system, via a network to remotely located development teams for analysis (step 440). These development teams can use the bug display tool loaded on their respective computers to analyze the outputs statements. The development teams analyze the output statements and try to diagnose the causes of any failures (step 440). Any fixes to prevent the failure are incorporated into subsequent devices on the production line ("new build"), which are also subjected to testing. When a data log taken from the new build device indicates that all of the problems have been fixed, the testing/calibration procedure is completed (step 410). This process is expected to improve productivity and yield rate.

The bug display tool 360 has other features and operates like other commercially available debugging and log analysis software tools. Thus, the programming and operation of this tool 360 is not described in further detail here. As an example, the bug display tool 360 can be programmed with features to help diagnose what happened after a device test failure. The device 102 is programmed to do its best to preserve in the data log buffer 170 what was in memory at the time of a device test failure, so that the device's state can be probed by the bug display tool 360 in hopes of determining the cause of the test failure. When the device 102 is connected to the station computer system 300, the data log buffer 170 is transferred to the computer system 300; this buffer represents the events logged leading up to the test failure.

While the embodiment described herein related to one particular bug display tool 360, other debugging and/or log analysis software programs as known in the art can be used that can benefit from the utilization of unused SRAM during device production as a data log buffer for calibration and testing.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyright rights whatsoever.

While the preferred embodiment of the invention has been illustrated and described, it will be appreciated that various changes can be made therein without departing from the scope and spirit of the invention.

What is claimed is:

1. A method of testing a wireless communication device, comprising:

designating as a data log buffer at least part of a memory of the device that is allocated for usage in an operational mode;

testing the device; and storing test log data in the data log buffer.

2. The method as claimed in claim 1 further comprising transmitting the test log data from the data log buffer to a test station.

3. The method as claimed in claim 2 further comprising processing the transmitted test log data using a bug display tool.

4. The method as claimed in claim 1 wherein at least part of a memory allocated for virtual machine or application usage is designated as the data log buffer.

5. The method as claimed in claim 4 wherein the data log buffer is at least large enough to store test log results from the device testing and from a device calibration procedure.

6. The method as claimed in claim 1 wherein the memory is a random access memory (RAM).

7. The method as claimed in claim 1 wherein the memory is a flash memory.

8. The method as claimed in claim 1 wherein testing the device includes at least one test selected from the group consisting of a board level test and an assembled level test.

9. A system for testing a wireless communication device, comprising:

a testing station communicative with the device and for testing the device; and a computer readable memory communicative with the device and having recorded thereon statements and instructions to designate as a data log buffer at least part of a memory of the device that is allocated for usage in an operational mode; and to store test log data obtained from testing the device in the data log buffer.

10. The system as claimed in claim 9 further comprising a bug display tool stored on the test station for processing the test log data obtained from the data log buffer.

11. The system as claimed in claim 9 wherein at least part of a memory allocated for virtual machine or application usage is designated as the data log buffer.

12. The system as claimed in claim 11 wherein the data log buffer is at least large enough to store test log data results from the device testing and from a device calibration procedure.

13. The system as claimed in claim 9 wherein the memory is a random access memory (RAM).

14. The system as claimed in claim 9 wherein the memory is a flash memory.

15. The system as claimed in claim 9 wherein testing the device includes at least one test selected from the group consisting of a board level test and an assembled level test.

16. The system as claimed in claim 9 wherein the memory comprises a non-volatile memory.

17. A computer program product for testing a wireless communication device, the product comprising:

a memory having computer readable code embodied therein, the code including statements and instructions to:

designate as a data log buffer at least part of a memory of the device that is allocated for usage in an operational mode; and store test log data obtained from testing of the device in the data log buffer.

18. The computer program product as claimed in claim 17 wherein the code further includes statements and instructions to transmit the test log data from the data log buffer to a test station.

19. The computer program product as claimed in claim 17 wherein at least part of a memory allocated for virtual machine or application usage is designated as the data log buffer.

20. The computer program product as claimed in claim 19 wherein the data log buffer is at least large enough to store test log data results from the device testing and from a device calibration procedure.

21. The computer program product as claimed in claim 17 wherein the memory is a random access memory (RAM).

22. The computer program product as claimed in claim 17 wherein the memory is a flash memory.

23. The computer program product as claimed in claim 17 wherein testing the device includes at least one test selected from the group consisting of a board level test and an assembled level test.

24. A method of assembling a wireless communication device comprising:
   assembling components of the device into the wireless communication device;
   designating as a data log buffer at least part of a memory of the device that is allocated for usage in an operational mode; and
   testing the device and storing test log data in the data log buffer.

25. The method of assembling a wireless communication device as claimed in claim 24 further comprising transmitting the test log data from the data log buffer to a test station.

26. The method of assembling a wireless device as claimed in claim 25 further comprising processing the transmitted test log data using a bug display tool.

\* \* \* \* \*